(12) United States Patent
Oviatt

(10) Patent No.: US 9,499,223 B2
(45) Date of Patent: Nov. 22, 2016

(54) BICYCLE CONTAINMENT APPARATUS

(71) Applicant: Thad V. Oviatt, Marietta, GA (US)

(72) Inventor: Thad V. Oviatt, Marietta, GA (US)

(*) Notice: Subject to any disclaimer, the term of this patent is extended or adjusted under 35 U.S.C. 154(b) by 113 days.

(21) Appl. No.: 14/255,226

(22) Filed: Apr. 17, 2014

(65) Prior Publication Data

US 2014/0311996 A1    Oct. 23, 2014

Related U.S. Application Data

(60) Provisional application No. 61/813,719, filed on Apr. 19, 2013.

(51) Int. Cl.
*B62H 5/00* (2006.01)
*B62H 3/00* (2006.01)
*B62H 3/02* (2006.01)

(52) U.S. Cl.
CPC ...... *B62H 5/00* (2013.01); *B62H 3/00* (2013.01); *B62H 3/02* (2013.01); *B62H 2003/005* (2013.01)

(58) Field of Classification Search
CPC ............... B62H 3/00; B62H 3/02; B62H 3/04; B62H 3/06; B62H 3/08; B62H 3/10; B62H 3/12; B62H 5/00; B62H 5/003; B62H 5/005; B62H 5/06; B62H 5/20; B62H 5/08; Y10T 70/5876; Y10T 70/5872; Y10T 70/5881; G07F 17/10; G07F 17/0057; E05B 71/00
USPC ................................................ 211/5, 17–24
See application file for complete search history.

(56) References Cited

U.S. PATENT DOCUMENTS

| | | | | |
|---|---|---|---|---|
| 3,762,569 A | * | 10/1973 | Spring | B62H 3/00 211/5 |
| 3,783,659 A | * | 1/1974 | Rossi | B62H 3/10 211/5 |
| 3,802,232 A | * | 4/1974 | Mattson | B62H 3/10 70/234 |
| 3,815,721 A | * | 6/1974 | Montoya | G07F 17/10 194/283 |
| 3,865,244 A | * | 2/1975 | Galen | E05B 71/00 211/24 |
| 3,865,245 A | * | 2/1975 | Lieb | B62H 3/10 211/5 |
| 3,934,436 A | * | 1/1976 | Candlin | B62H 3/00 211/5 |
| 3,964,611 A | * | 6/1976 | Galen | B62H 3/00 211/22 |
| 3,970,197 A | * | 7/1976 | Bale, Jr. | B62H 3/10 211/5 |

(Continued)

*Primary Examiner* — Patrick Hawn
(74) *Attorney, Agent, or Firm* — Troutman Sanders LLP; Ryan A. Schneider; Daniel T. Sharpe

(57) ABSTRACT

A bicycle containment system is disclosed. The system can include one or more vertical supports, one or more cantilevered crossbars pivotally connected to one or more vertical supports, one or more wheel locking mechanisms, and a control system. Each cantilevered crossbar can include two substantially parallel extending arms and a frame locking mechanism. The frame locking mechanism can be made up of one or more frame locking bars and one or more frame locking actuators. Each wheel locking mechanism can include a wheel locking bar and a wheel locking actuator. The locking mechanism control system can be configured to actuate the frame locking actuators and the wheel locking actuators.

13 Claims, 7 Drawing Sheets

(56) References Cited

U.S. PATENT DOCUMENTS

| | | | | |
|---|---|---|---|---|
| 4,433,786 | A * | 2/1984 | Wahl | E05B 71/00 |
| | | | | 211/17 |
| 4,433,787 | A * | 2/1984 | Cook | B62H 3/00 |
| | | | | 194/902 |
| 5,323,915 | A * | 6/1994 | Fortune, Sr. | B62H 3/00 |
| | | | | 211/22 |
| 5,917,407 | A * | 6/1999 | Squire | B62H 3/00 |
| | | | | 194/205 |
| 8,678,205 | B2 * | 3/2014 | Mercat | B62H 3/02 |
| | | | | 211/5 |
| 2007/0220933 | A1 * | 9/2007 | Gagosz | B62H 3/00 |
| | | | | 70/233 |
| 2009/0240575 | A1 * | 9/2009 | Bettez | B62H 3/00 |
| | | | | 705/13 |
| 2010/0163503 | A1 * | 7/2010 | Kelly | B62H 3/00 |
| | | | | 211/85.3 |
| 2012/0234777 | A1 * | 9/2012 | Chen | B62H 3/00 |
| | | | | 211/5 |
| 2014/0265237 | A1 * | 9/2014 | Strother | B62H 5/00 |
| | | | | 280/297 |
| 2014/0277706 | A1 * | 9/2014 | Minnis | G07F 17/0057 |
| | | | | 700/237 |
| 2015/0360739 | A1 * | 12/2015 | Ashlag | B62H 3/04 |
| | | | | 29/426.2 |

\* cited by examiner

BICYCLE CONTAINMENT APPARATUS

CROSS-REFERENCE TO RELATED APPLICATION AND PRIORITY CLAIM

This application claims the benefit, under 35 U.S.C. §119 (e), of U.S. Provisional Patent Application No. 61/813,719, filed 19 Apr. 2013, entitled "BICYCLE CONTAINMENT APPARATUS," the entire contents and substance of which is incorporated herein by reference in its entirety as if fully set forth below.

BACKGROUND

1. Field of the Disclosure

Embodiments of the present disclosure relate generally to a bicycle rack, and more particularly to a bicycle rack with integrated locking.

2. Background of Related Art

Individual bicyclists currently rely on carrying locks to secure their bicycles. Bike locks are often cumbersome to carry or do not provide sufficient locking capabilities. Many bicyclists lock only their bicycle's frame to the bike rack, leaving quick release front wheels vulnerable to theft. Larger locks that more easily engage both the frame and the front wheel are heavier and a greater burden to carry around. Lighter, thinner locks such as cable locks are more easily transported, but are much less secure and more easily cut by a potential thief.

Bike racks are often stationed near entrances to buildings and at public transportation sites, which provide metal scaffolds to which individuals can lock their own bicycles. These racks vary in shape and size, and as a result the ease with which bicycles can be secured will often vary. Additionally, because these racks are free to use, bicyclists will often lock up their bicycles in such a way as to not maximize the rack space. This can be frustrating for a bicyclist who has arrived at a destination only to find open spots on a bike rack rendered unusable by an improperly secured bicycle.

As a result of these and other problems, "bike share" services have recently become very popular. These services allow users to rent bicycles, usually on an hourly basis, from an automated kiosk. The bicycles are taken from and returned to designated racks with clearly defined spaces and automated locks designed specifically for the particular bike share bicycle. These bike shares allow a user to go on a mobile application and view open parking spaces and available bicycles, so that they may ensure that they will be able to pick up a bicycle nearby and return it to an open space near their destination. They do not need to carry a lock, or worry that a bike rack will be full or unavailable upon arriving at a destination is one of the main reasons these services have grown so quickly.

However, these services also have drawbacks. They require users to ride one type of bicycle. This may be suitable for some users, but for longer distances, areas where gearing is important (such as hilly regions), or users with special needs (for example: very large, very small, or disabled riders) these bicycles simply may not be comfortable or practical. Additionally, because these services charge by the hour, users who want to go on longer rides or travel with a bicycle will often need to purchase their own bicycle to avoid very large rental costs. While for some cyclists bike shares may eliminate the need to purchase and maintain a personal bicycle, for many, the cost of the bike share is in addition to, not instead of, the cost of a personal bicycle.

Accordingly, what is needed is a system that addresses the problems in the prior art, without requiring bicyclists to use one type of rental bicycle. It should allow users to use their own personal bicycles, but do so securely and potentially allow for riders to reserve or check availability before they set out. It is to such a system that embodiments of the present disclosure are primarily directed.

BRIEF SUMMARY OF THE DISCLOSURE

Embodiments of the present disclosure relate generally to an automated bicycle lock, more specifically the basis of a bicycle parking space system. A system according to the present disclosure would present a unique docking space for bicycles.

In some embodiments, a bicycle containment system according to the present disclosure can comprise at least one vertical support, at least one cantilevered crossbar, at least one wheel locking mechanism, and a locking mechanism control system. The cantilevered crossbar can be pivotally connected to one of the vertical supports. In some embodiments, each cantilevered crossbar can include two substantially parallel extending arms and a frame locking mechanism. A frame locking mechanism according to the present disclosure can comprise at least one frame locking bar and at least one frame locking actuator. Furthermore, in some embodiments, the wheel locking mechanisms can comprise at least one wheel locking bar and at least one wheel locking actuator. A locking mechanism control system in accordance with the present disclosure can be configured to actuate the frame locking actuators and the wheel locking actuators.

In some other embodiments according to the present disclosure, a bicycle security system can comprise a plurality of bicycle locking locations and a control system. Each bicycle locking location can comprise a frame lock portion and a wheel lock portion. In some embodiments, frame lock portion can comprise two substantially parallel extending arms connected to a vertical support at a first end of each extending arm, at least one frame locking bar located at a second end of at least one of the two extending arms, and at least one frame locking actuator in communication with the at least one frame locking bar. Additionally, the wheel lock portion can be located on the vertical support and comprise at least one wheel locking bar and at least one wheel locking actuator. A control system according to the present disclosure can be configured to selectively lock a bicycle into one of the plurality of bicycle locking locations. In some embodiments, the control system can be configured to selectively lock or unlock a bicycle in response to a user input.

These and other objects, features and advantages of the present disclosure will become more apparent upon reading the following specification in conjunction with the accompanying drawing figures.

DETAILED DESCRIPTION

Figure 1:
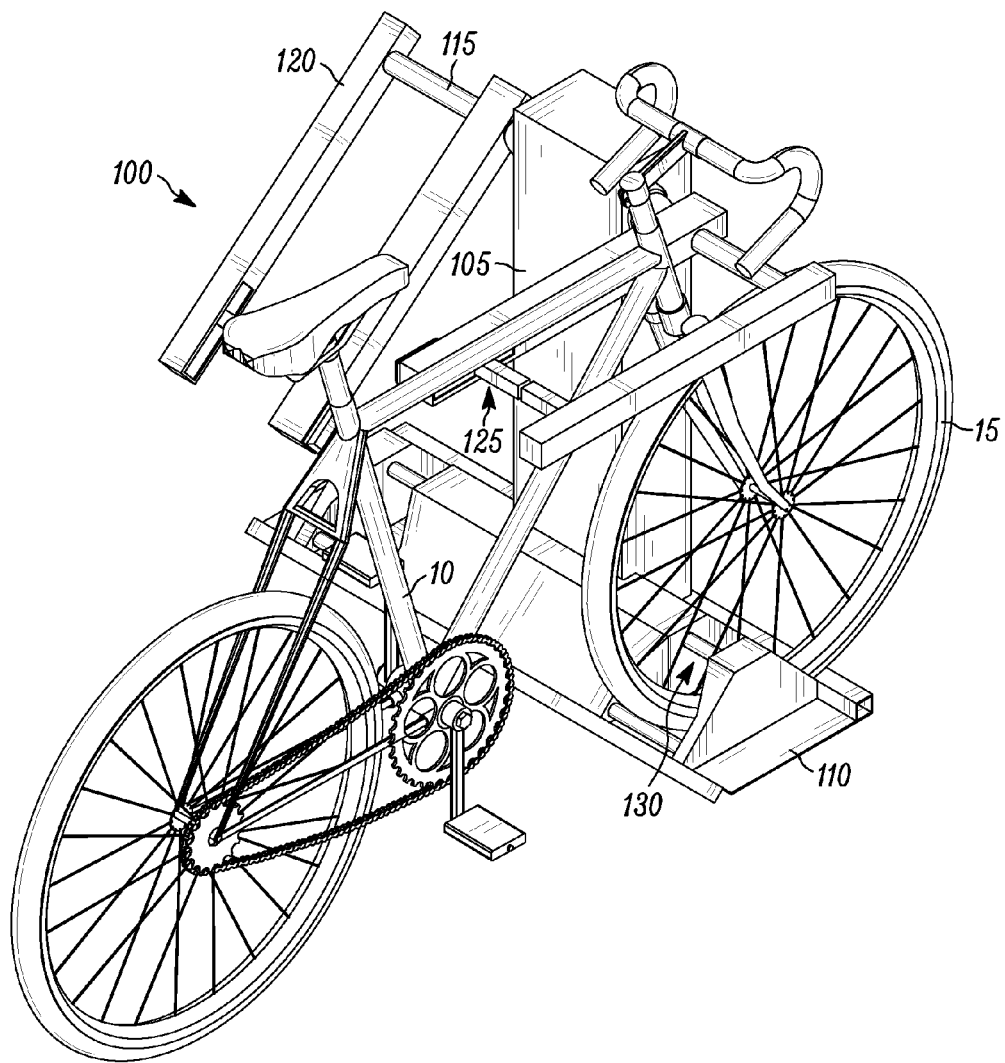
FIG. 1 illustrates a bicycle locking system according to the present disclosure with a bicycle engaged therewith.

To facilitate an understanding of the principles and features of the various embodiments of the disclosure, various illustrative embodiments are explained below. Although exemplary embodiments of the disclosure are explained in detail as being a bicycle containment apparatus, it is to be understood that other embodiments are contemplated, such as embodiments employing other types of vehicles or locking devices. Accordingly, it is not intended that the disclosure is limited in its scope to the details of construction and arrangement of components set forth in the following description or examples. Embodiments of the disclosure are capable of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of embodiments according to the disclosure are intended to be illustrative and not restrictive. Many suitable materials that would perform the same or a similar function as the materials described herein are intended to be embraced within the scope of the disclosure. Such other materials not described herein can include, but are not limited to, for example, materials that are developed after the time of the development of this disclosure.

To facilitate an understanding of the principles and features of the present disclosure, various illustrative embodiments are explained below. In particular, various embodiments of the present disclosure are described as a bicycle lock or bicycle paring space. Some aspects of the disclosure, however, may be applicable to other contexts, and embodiments employing these aspects are contemplated. Accordingly, where terms such as "bicycle" or "lock" or related terms are used throughout this disclosure, it will be understood that other devices, entities, objects, or activities can take the place of these in various embodiments of the disclosure.

Figure 2:
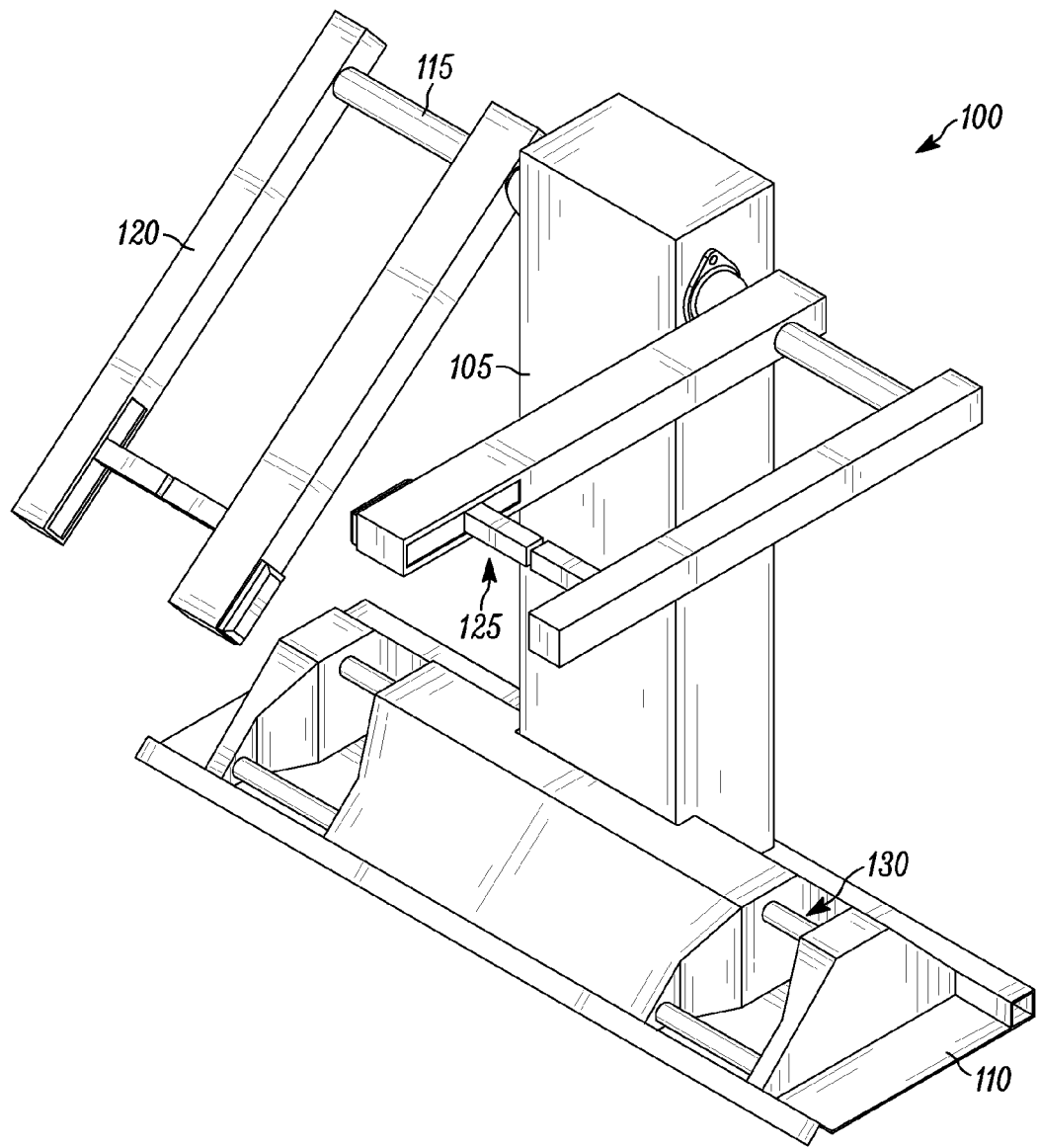
FIG. 2 illustrates a bicycle locking system according to the present disclosure without a bicycle engaged therewith.

An embodiment of a bicycle containment system according to the present disclosure is shown in FIG. 1. As shown in FIG. 1, bicycle 10 is engaged with bicycle containment system 100. FIG. 2 illustrates system 100 without bicycle 10. Bicycle containment system 100 can include vertical support 105 coupled to base 110. Vertical support 105 can be connected to cantilevered crossbars 115 such that the crossbars 115 can pivot with respect to vertical support 105. In some embodiments, each crossbar 115 can include two substantially parallel extending arms 120 spaced to accommodate the frame of bicycle 10 in between them. At the end of the parallel extending arms 120, there can be a frame locking mechanism 125. In some embodiments, system 100 can also have a wheel locking mechanism 130 located on or near base 110 designed to engage wheel 15 of bicycle 10.

Figure 3:
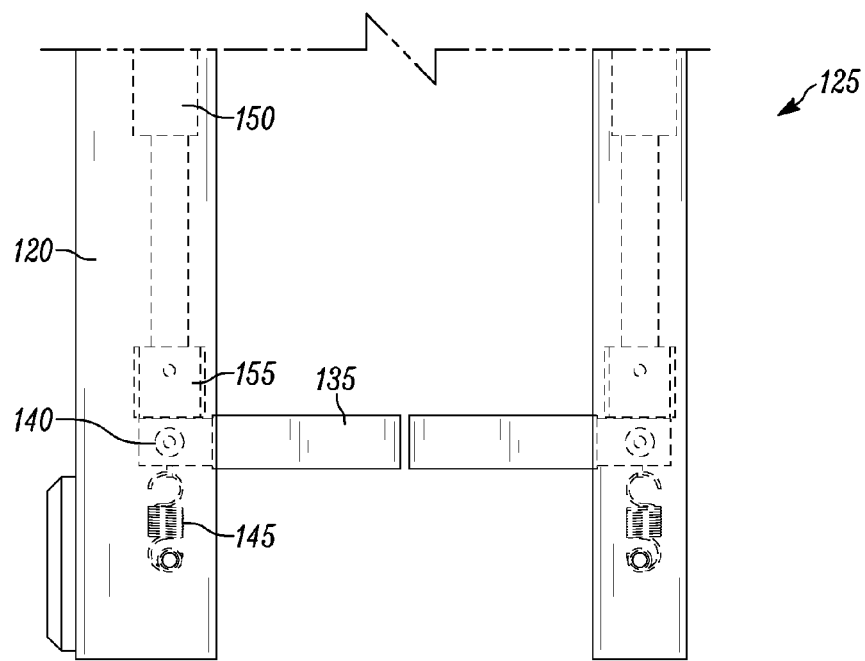
FIG. 3 illustrates the frame locking system of the embodiment pictured in FIGS. 1 and 2 in the locked position.
Figure 4:
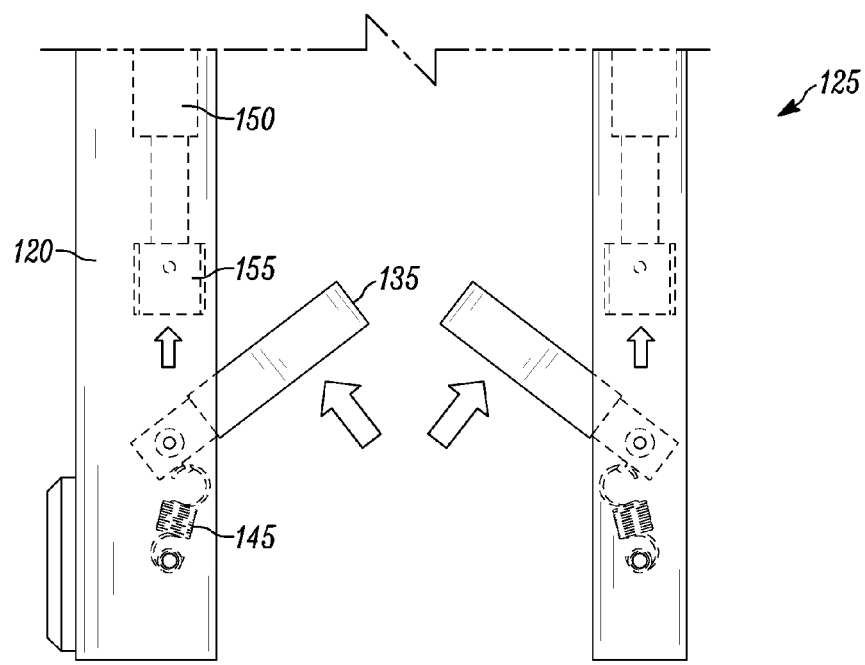
FIG. 4 illustrates the frame locking system of the embodiment pictured in FIGS. 1 and 2 in the unlocked position.

Frame locking mechanism 125 can be of many designs known in the art. In some embodiments, such as the embodiment illustrated in FIGS. 3 and 4, frame locking mechanism 125 can comprise frame locking bars 135 connected to extending arms 120 at frame locking pivots 140. During non-locked operation, frame locking bars 135 can be generally maintained perpendicular to extending arms 120 by springs 145. Springs 145 can be chosen such that frame locking bars 135 can pivot to allow a user to push bicycle 10 past frame locking bars 135.

In an exemplary embodiment, once the system is to be locked, linear actuators 150 can be activated to move to their extended position. Linear actuators 150 can be of any type, including pneumatic pistons, motor driven actuators, or manual actuators. In their extended position, linear actuators 150 can engage frame locking bar stops 155 with frame locking bars 135. While frame locking bar stops 155 are engaged with frame locking bars 135, frame locking bars 135 are unable to pivot. Since frame locking bars can be maintained in their current position, bicycle 10 cannot be removed from system 100.

Some embodiments according to the present disclosure may have only one frame locking bar 135 and one linear actuator 150. Systems according to this design may function substantially similarly to the embodiment shown and described in FIGS. 3 and 4.

Figure 5:
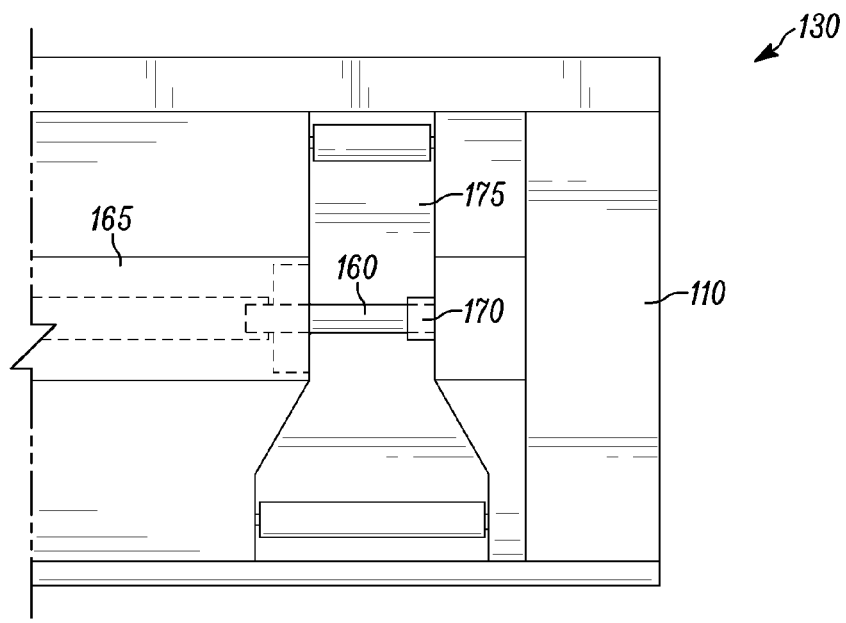
FIG. 5 illustrates the wheel locking system of the embodiment pictured in FIGS. 1 and 2 in the locked position.
Figure 6:
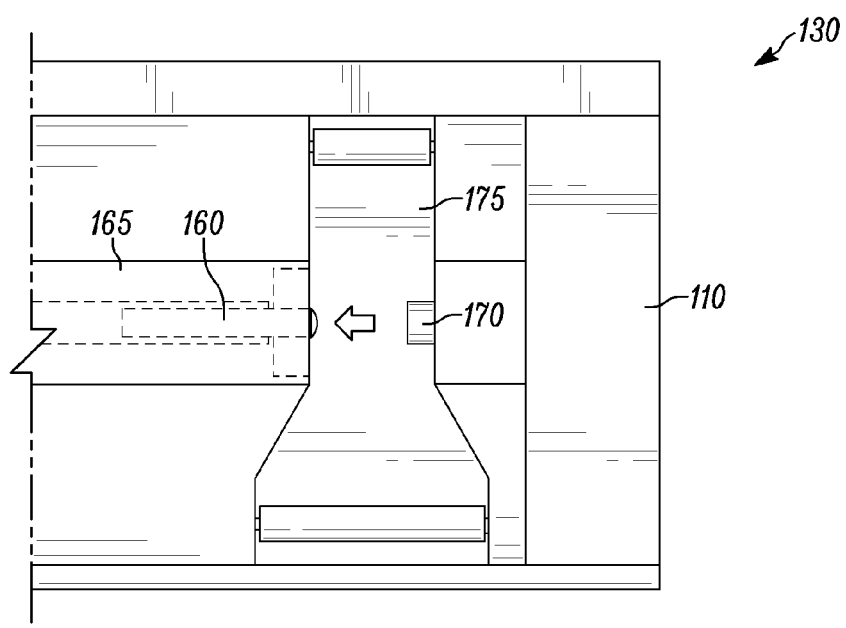
FIG. 6 illustrates the wheel locking system of the embodiment pictured in FIGS. 1 and 2 in the unlocked position.

As illustrated in FIGS. 5 and 6, in some embodiments, wheel locking mechanism 130 can be designed such that it is capable of retaining the front wheel 15 of bicycle 10. Wheel locking mechanism 130 can comprise wheel locking bar 160 that is extendable from linear actuator 165. In some embodiments, wheel locking bar 160 may be selectively extended to seat in wheel locking bar receiver 165. The region between linear actuator 165 and locking bar receiver 170 can be a wheel well 175.

When bicycle 10 is desired to be locked up, wheel 15 of bicycle 10 may be placed in wheel well 175, and linear actuator 165 may be actuated to move wheel locking bar 160 through wheel 15 and into locking bar receiver 170. In some embodiments, once wheel locking bar 160 is extended into locking bar receiver 170, the wheel 15 can no longer be removed from wheel locking mechanism 130. When the user desires to unlock bicycle 10, linear actuator can retract wheel locking bar 160 from locking bar receiver 170, thereby allowing wheel 15 to be removed from wheel well 175.

Figure 7:
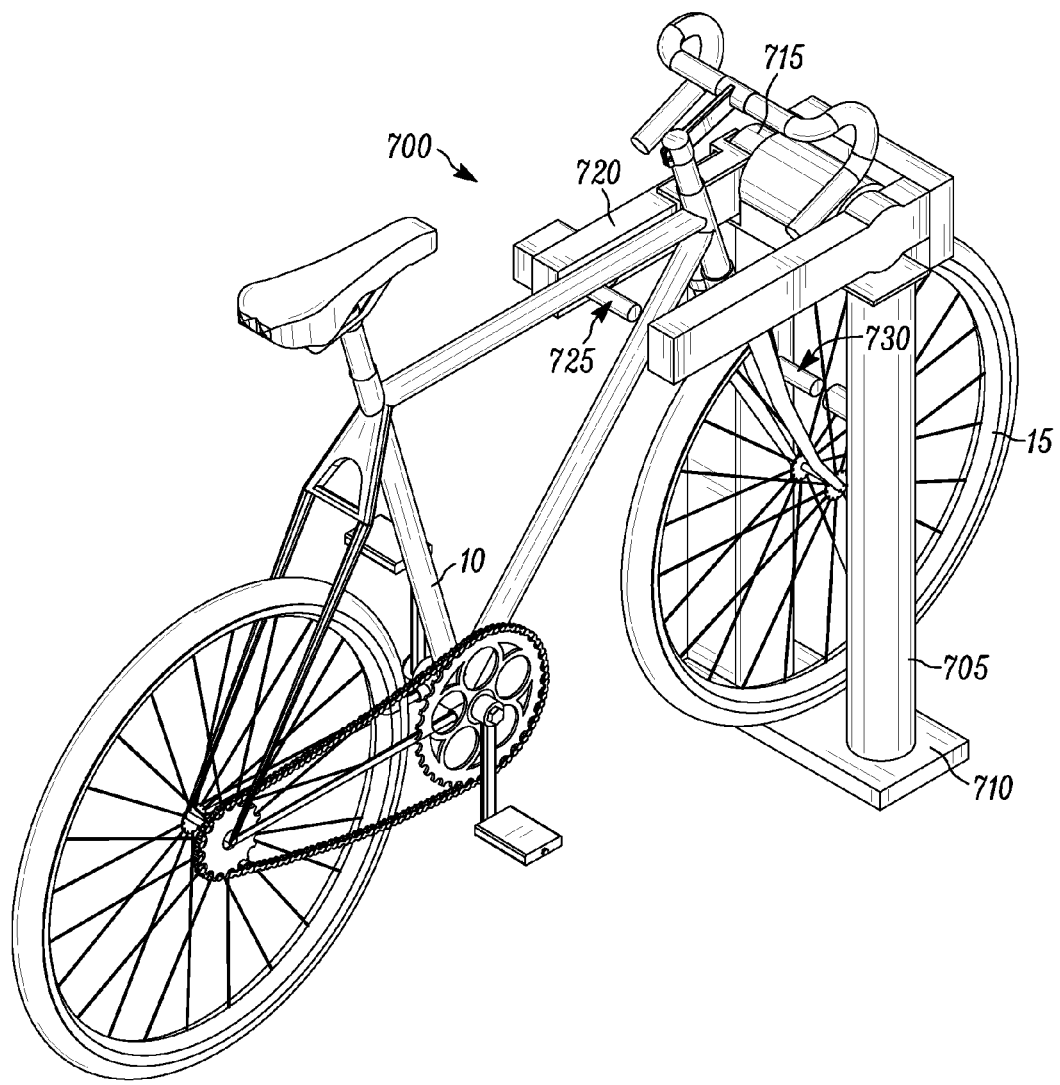
FIG. 7 illustrates another embodiment of a bicycle locking system in accordance with the present disclosure with a bicycle engaged therewith.
Figure 8:
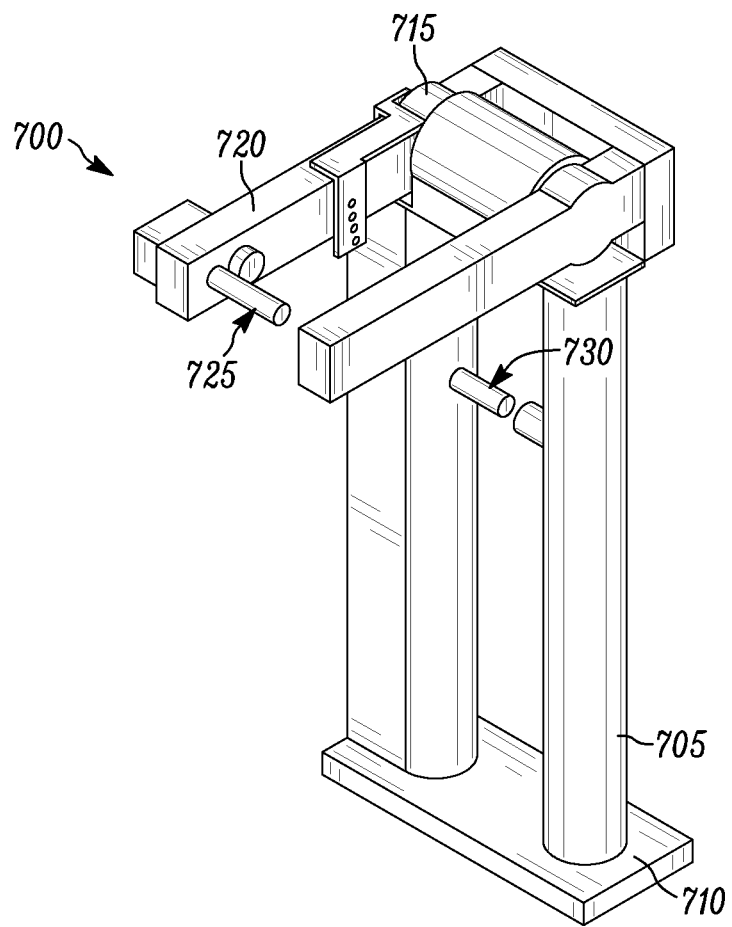
FIG. 8 illustrates another embodiment of a bicycle locking system in accordance with the present disclosure without a bicycle engaged therewith.

Another embodiment according to the present disclosure is illustrated in FIGS. 7 and 8. Bicycle containment system 700 is shown with a bicycle 10 engaged therewith in FIG. 7, and without bicycle 10 in FIG. 8. Bicycle containment system 700 can include vertical supports 705 coupled to base 710. In some embodiments, vertical supports 705 can be connected to either end of cantilevered crossbar 715 such that the crossbar 715 can pivot with respect to vertical supports 705. Crossbar 715 can include two substantially parallel extending arms 720 spaced to accommodate the frame of bicycle 10 in between them. At the end of the parallel extending arms 720, there can be a frame locking mechanism 725. Some embodiments of system 700 can also have a wheel locking mechanism 730 located on vertical supports 705 designed to engage wheel 15 of bicycle 10.

Figure 9:
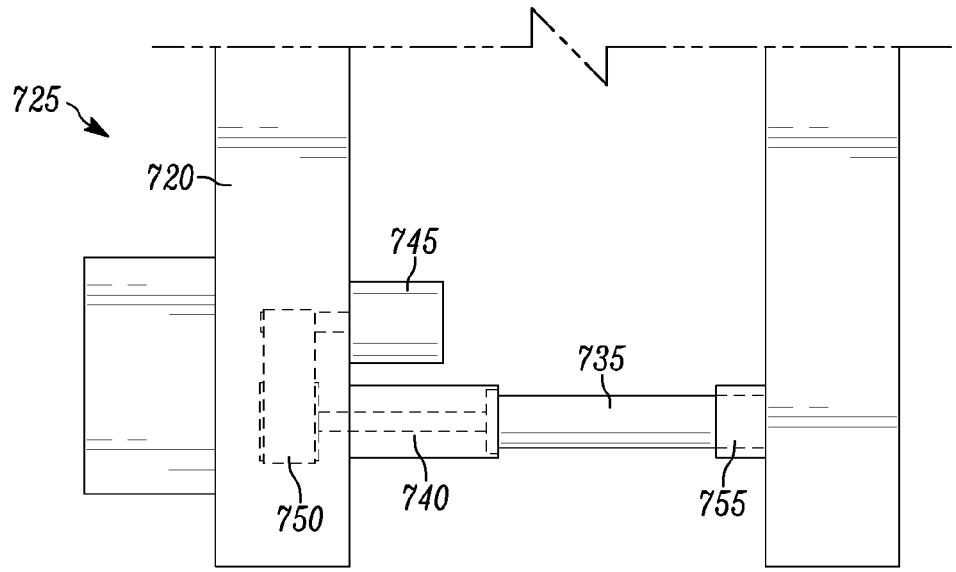
FIG. 9 illustrates the frame locking system of the embodiment pictured in FIGS. 1 and 2 in the locked position.
Figure 10:
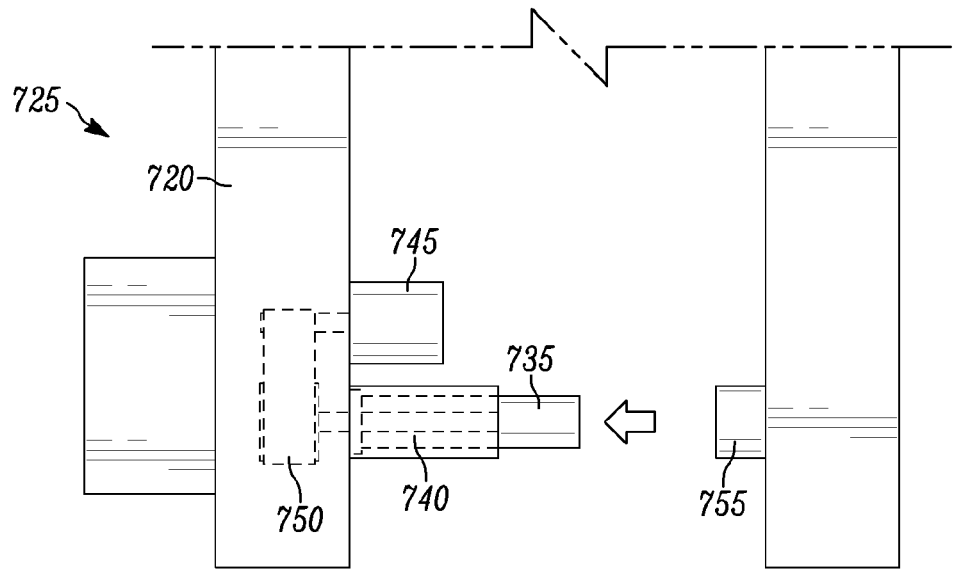
FIG. 10 illustrates the frame locking system of the embodiment pictured in FIGS. 1 and 2 in the unlocked position.

In the embodiment shown in FIGS. 9 and 10, frame locking mechanism 725 can comprise frame locking bar 735 that is extendable from linear drive 740. In some embodiments, linear drive 740 can be driven by a motor 745 connected via belt 750. When motor 745 rotates belt 750, linear drive 740 can move frame locking bar. Once bicycle 10 has been inserted between extending arms 720, linear drive 740 can extend frame locking bar 735 into frame locking bar receiver 755. When frame locking bar 735 has been moved to this extended position, bicycle 10 is secured in bicycle containment system 700.

Upon the return of the user to bicycle containment system 700, bicycle 10 can be unlocked. Linear drive can retract frame locking bar 735 from frame locking bar receiver 755, thereby opening a space between extending arms 720 that can allow bicycle 10 to be removed from bicycle containment system 700. A mechanism substantially similar to frame locking mechanism 725 can also be employed in the form of wheel locking mechanism 730. Alternatively, other known systems for locking and unlocking a space (such as the embodiment of system 125 illustrated in FIGS. 3 and 4) may be used in place of, or in addition to frame locking mechanism 725, or wheel locking mechanism 730 in this or other embodiments.

With regard to the use of some embodiments, a user may approach a bicycle containment system according to the present disclosure and interact with a control panel. Control panels may be located at each space, or a single panel may control multiple spaces. The user can then indicate which space they would like to use, and indicate a source of payment for that space. Sources of payment can include: a credit card, an account with the rental system connected to a bank account, a debit card, or cash. Once the user has selected an available space and a method of payment, the control panel can signal the locking mechanism control system to unlock the desired space by moving the linear actuators accordingly. The user may then go to the reserved space, and position their bicycle in the space for locking. Locking mechanism control system can then lock the bicycle by moving the linear actuators accordingly in response to, for example, a bicycle being detected, a button being pressed, or an amount of time elapsing. The user may then leave the area, for a predetermined time or for a non-determined time depending on the payment method or other indication entered into the control panel.

Upon returning to the system, the user may indicate via the control panel that they would like their bicycle unlocked. They may do this by, for example, swiping the method of payment used, entering a code given at the time of space rental, or through some other identification means. Once the control panel has determined the identity of the user and the space to be unlocked, the locking mechanism control system can be signaled to unlock the correct space. The locking control mechanism control system can then move the linear actuators accordingly to effect the unlocking of the user's bicycle.

In some embodiments according to the present disclosure, the control panel may be an internet-based control panel. In such a system, the locking mechanism control system can be connected to the internet, and the user may use a device such as a computer, smartphone, or tablet as the control panel. Smartphone or tablet applications may be utilized for ease of smartphone or tablet use, and an internet interface can be utilized for users interfacing with the system on a computer or other device.

In some embodiments of a bicycle containment system according to the present disclosure, materials are selected according to certain considerations. Because this disclosure is directed to bicycle racks that are often located outside, materials should be selected that will not rust, corrode, or weaken in the elements. Furthermore, because bicycles may be pushed into or pulled out of the system with significant force, high strength materials are desired. Similarly, components are selected according to certain considerations. Waterproof connections and actuators may be desired for outdoor applications. Operating temperatures may also drive component choice since temperatures may range from approximately −40 to 120 degrees Fahrenheit (approximately −40 to 50 degrees Celsius). Furthermore, because the system must deter potential bicycle thieves, the components should be chosen to be substantially robust and tamper resistant for such a purpose.

In some embodiments of a bicycle containment system according to the present disclosure, dimensions are selected according to certain considerations. Because bicycles come in many different shapes and sizes, the dimensions of the system can be very significant. In order to capture a significant subset of bicycles currently on the market, vertical supports can be selected to be approximately 24 inches to 36 inches (approximately 60 cm to 90 cm) tall, for example. The extending arms can be, for example and not limitation, approximately 20 inches to 36 inches long (approximately 50 cm to 90 cm). In order to lock various frames with a given length and height of arm, the cantilevered crossbars can allow the extending arms to pivot between approximately horizontal and 45 degrees below horizontal. Because wheel sizes of bicycles can vary, the wheel locking mechanisms can be placed from approximately 2 inches (approximately 5 cm) above the ground to approximately 18 inches (approximately 45 cm) above the ground.

In some embodiments according to the present disclosure, alternative energy may be used to power the system. For example, solar or wind power may partially or fully power the system to reduce the operational costs and reliance on the local power grid. Solar panels can be placed above the system and additionally serve to provide shade to the bicycles engaged with the system, or they can be located elsewhere.

While certain systems and methods related to a bicycle containment apparatus have been disclosed in some exemplary forms, many modifications, additions, and deletions may be made without departing from the spirit and scope of the system, method, and their equivalents, as set forth in claims to be filed in a later, non-provisional application. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other devices, methods, and systems for carrying out the several purposes of the embodiments and claims presented in this application. It is important, therefore, that the claims be regarded as including such equivalent constructions.

What is claimed is:

1. A bicycle containment system comprising:
    at least one vertical support;
    at least one crossbar pivotally connected to the at least one vertical support, each crossbar being connected to:
        two substantially parallel extending arms; and
        a frame locking mechanism comprising:
            at least one frame locking bar; and
            at least one frame locking actuator;
    at least one wheel locking mechanism comprising:
        at least one wheel locking bar; and
        at least one wheel locking actuator;
    a control system configured to actuate the frame locking actuators and the wheel locking actuators
    wherein the at least one frame locking actuator comprises a linear actuator in each extending arm;
    wherein each extending arm comprises a frame locking bar; and
    wherein extending the linear actuators prevents the frame locking bars from rotating with respect to the extending arms.

2. The bicycle containment system of claim 1, wherein:
    each vertical support is connected to two crossbars and two wheel locking mechanisms.

3. The bicycle containment system of claim 1, wherein:
    each crossbar and each wheel locking mechanism is connected between two vertical supports.

4. The bicycle containment system of claim 1, wherein the two substantially parallel extending arms are between approximately 20 inches (approximately 50 cm) long and approximately 36 inches (approximately 90 cm) long.

5. The bicycle containment system of claim 4, wherein the two substantially parallel extending arms are configured to rotate between horizontal and 45 degrees below horizontal.

6. The bicycle containment system of claim 1, wherein:
    each frame locking bar is cylindrical, and oriented perpendicular to the extending arms, and extends from one of the two extending arms; and
    wherein a frame locking actuator moves a frame locking bar towards the other of the two extending arms.

7. The bicycle containment system of claim 1, wherein a control system is capable of providing information related to at least one of:
    the number of available bicycle locking locations, a price to reserve a bicycle locking location, the amount of time a bicycle locking location has been occupied, and payment instruct ions.

8. The bicycle containment system of claim 1, wherein the control system is capable of connecting to the internet, such that the locking mechanism control system can be accessed remotely.

9. The bicycle containment system of claim 8, wherein the control system can lock or unlock one or more of the frame locking actuators or wheel locking actuators based on data received via the internet.

10. A bicycle containment system comprising:
    a vertical support;
    a crossbar pivotally connected to the vertical support, the crossbar being connected to:
        two substantially parallel extending arms connected to the crossbar at their first ends; and
        a frame locking mechanism;
        a wheel locking mechanism;
    wherein the frame locking mechanism comprises a linear actuator in each extending arm;
    wherein each extending arm comprises a frame locking bar;
    wherein extending the linear actuators prevent the frame locking bars from rotating with respect to the extending arms;
    wherein the vertical support is between approximately 24 inches (approximately 60 cm) and approximately 36 inches (approximately 90 cm); and
    wherein the length of the extending arms is selected such that the frame locking mechanism can engage a plurality of bicycle frames, and is between approximately 20 inches (approximately 50 cm) and approximately 36 inches (approximately 90 cm).

11. The bicycle containment system of claim 10, wherein the two substantially parallel extending arms are configured to rotate about their first ends between horizontal and 45 degrees below horizontal.

12. The bicycle containment system of claim 10, wherein:
    each frame locking bar is cylindrical, and oriented perpendicular to the extending arms, and extends from one of the two extending arms; and
    wherein a frame locking actuator moves a frame locking bar towards the other of the two extending arms.

13. The bicycle containment system of claim 10, wherein the frame locking mechanism and the wheel locking mechanism are controlled by a control system configured to selectively lock a bicycle to the bicycle containment system.

* * * * *